United States Patent
He et al.

(10) Patent No.: US 9,674,753 B2
(45) Date of Patent: *Jun. 6, 2017

(54) CHANNEL STATE INFORMATION FEEDBACK SCHEME FOR COOPERATIVE MULTI POINT TRANSMISSION AND CARRIER AGGREGATION SCENARIO

(71) Applicant: Intel Corporation, Santa Clara, CA (US)

(72) Inventors: Hong He, Beijing (CN); Alexei Vladimirovich Davydov, Nizhny Novgorod (RU); Youn Hyoung Heo, San Jose, CA (US); Jong-Kae Fwu, Sunnyvale, CA (US); Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,658

(22) Filed: Feb. 2, 2016

(65) Prior Publication Data

US 2016/0157241 A1    Jun. 2, 2016

Related U.S. Application Data

(63) Continuation of application No. 14/126,654, filed as application No. PCT/US2013/066786 on Oct. 25, 2013, now Pat. No. 9,277,471.

(Continued)

(51) Int. Cl.
*H04W 36/20* (2009.01)
*H04W 28/24* (2009.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
CPC . H04W 72/06; H04W 76/046; H04W 28/046; H04W 72/0413; H04W 72/08;
(Continued)

(56) References Cited

U.S. PATENT DOCUMENTS 7,965,651 B2    6/2011  Du et al.
8,072,963 B2   12/2011  Suzuki
(Continued)

FOREIGN PATENT DOCUMENTS

CN  WO 2012144645 A1 * 10/2012 ............. H04B 7/024
EP         2624473 A2    8/2013
(Continued)

OTHER PUBLICATIONS

Samsung "CSI Collision Handling for CoMP", R1-123468, 3GPP TSG RAN WG1 #70, 3 pages, Sep. 2012.*

(Continued)

*Primary Examiner* — Ian N Moore
*Assistant Examiner* — Justin T Van Roie
(74) *Attorney, Agent, or Firm* — Schwegman Lundberg & Woessner, P.A.

(57) ABSTRACT

Embodiments of a system and method for reporting uplink control information (UCI) are generally described herein. In some embodiments, a first and second component carrier (CC) is provided for a user equipment (UE). The first and second CC are configured with transmission mode (TM) 10 and TMs 1-9, respectively. A first channel state information (CSI) report for the first CC with TM 10 and a second CSI report for the second CC with at least one of TMs 1-9 are scheduled for transmission in a subframe. A collision is (Continued)

detected between the first and second CSI reports. Priority is assigned to the first CSI report or the second CSI report based on a prioritization parameter. The prioritized CSI report is transmitted based the prioritization parameter.

27 Claims, 8 Drawing Sheets

Related U.S. Application Data

(60) Provisional application No. 61/721,436, filed on Nov. 1, 2012.

(51) Int. Cl.

| | |
|---|---|
| H04W 52/02 | (2009.01) |
| H04W 24/08 | (2009.01) |
| H04J 3/06 | (2006.01) |
| H04L 5/00 | (2006.01) |
| H04W 16/24 | (2009.01) |
| H04W 8/00 | (2009.01) |
| H04W 72/04 | (2009.01) |
| H04W 76/02 | (2009.01) |
| H04B 7/0417 | (2017.01) |
| H04B 7/0452 | (2017.01) |
| H04B 7/06 | (2006.01) |
| H04W 28/02 | (2009.01) |
| H04W 4/00 | (2009.01) |
| H04W 76/04 | (2009.01) |
| H04L 29/12 | (2006.01) |
| H04W 16/20 | (2009.01) |
| H04W 16/26 | (2009.01) |
| H04W 60/04 | (2009.01) |
| H04W 64/00 | (2009.01) |
| H04W 36/14 | (2009.01) |
| H04W 24/10 | (2009.01) |
| H04J 11/00 | (2006.01) |
| H04W 28/04 | (2009.01) |
| H04W 72/06 | (2009.01) |
| H04W 72/08 | (2009.01) |
| H04W 36/30 | (2009.01) |
| H04W 72/12 | (2009.01) |
| H04W 24/04 | (2009.01) |
| H04W 88/02 | (2009.01) |
| H04W 88/08 | (2009.01) |
| H04W 88/06 | (2009.01) |
| H04W 88/16 | (2009.01) |
| H04W 24/02 | (2009.01) |

(52) U.S. Cl.
CPC .......... *H04B 7/0626* (2013.01); *H04J 3/0614* (2013.01); *H04J 11/00* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(58) Field of Classification Search
CPC ..... H04W 88/02; H04W 88/08; H04W 36/20; H04W 24/04; H04W 72/1231; H04W 36/30; H04W 76/048; H04W 24/10; H04W 36/14; H04W 16/26; H04W 64/003; H04W 60/04; H04W 16/20; H04W 28/0268; H04W 52/0235; H04W 72/0446; H04W 4/005; H04W 8/005; H04W 72/042; H04W 76/023; H04W 16/24; H04W 24/08; H04W 52/0216; H04W 28/24; H04W 24/02; H04W 88/16; H04W 88/06; H04J 11/00; H04J 3/0614; H04L 61/3075; H04L 61/3005; H04L 5/0048; H04L 5/0046; H04L 5/006; H04B 7/0452; H04B 7/0417; H04B 7/0626; Y02B 60/50

See application file for complete search history.

(56) References Cited

U.S. PATENT DOCUMENTS

| | | | |
|---|---|---|---|
| 8,150,477 B2 | 4/2012 | Cho et al. | |
| 8,174,957 B2 | 5/2012 | Ko et al. | |
| 8,660,197 B2 | 2/2014 | Lindgren et al. | |
| 8,681,627 B2 | 3/2014 | Choudhury et al. | |
| 8,885,458 B2 | 11/2014 | Diachina et al. | |
| 9,042,881 B2 | 5/2015 | Kwon et al. | |
| 9,100,160 B2 | 8/2015 | Martinez Tarradell et al. | |
| 9,225,399 B2 | 12/2015 | Shan et al. | |
| 9,253,698 B2 | 2/2016 | Zhang et al. | |
| 9,277,471 B2 * | 3/2016 | He ........................ | H04W 28/24 |
| 2001/0051994 A1 | 12/2001 | Serizawa et al. | |
| 2004/0208183 A1 | 10/2004 | Balachandran et al. | |
| 2005/0026616 A1 | 2/2005 | Cavalli et al. | |
| 2005/0124372 A1 | 6/2005 | Lundby et al. | |
| 2005/0148348 A1 | 7/2005 | Cramby et al. | |
| 2006/0058033 A1 | 3/2006 | Marsan et al. | |
| 2007/0111747 A1 | 5/2007 | Lundby et al. | |
| 2007/0298725 A1 | 12/2007 | Ryu | |
| 2008/0188247 A1 | 8/2008 | Worrall | |
| 2009/0268624 A1 | 10/2009 | Imamura et al. | |
| 2010/0074109 A1 | 3/2010 | Klingenbrunn et al. | |
| 2010/0097937 A1 | 4/2010 | Pietraski et al. | |
| 2010/0272037 A1 | 10/2010 | Lee et al. | |
| 2010/0278038 A1 | 11/2010 | Stahle et al. | |
| 2011/0038326 A1 | 2/2011 | Davies et al. | |
| 2011/0059744 A1 | 3/2011 | Won et al. | |
| 2011/0110347 A1 | 5/2011 | Mun | |
| 2011/0149728 A1 | 6/2011 | Lee | |
| 2011/0190000 A1 | 8/2011 | Kwun | |
| 2011/0205886 A1 | 8/2011 | Maruyama et al. | |
| 2011/0244877 A1 | 10/2011 | Farajidana et al. | |
| 2011/0267854 A1 | 11/2011 | Flannery et al. | |
| 2011/0294491 A1 | 12/2011 | Fong et al. | |
| 2011/0310769 A1 | 12/2011 | Lee et al. | |
| 2011/0319065 A1 | 12/2011 | Dalsgaard et al. | |
| 2012/0033643 A1 | 2/2012 | Noh et al. | |
| 2012/0039252 A1 | 2/2012 | Damnjanovic et al. | |
| 2012/0039298 A1 | 2/2012 | Lee et al. | |
| 2012/0057479 A1 | 3/2012 | Maruyama et al. | |
| 2012/0083283 A1 | 4/2012 | Phan et al. | |
| 2012/0093124 A1 | 4/2012 | Zhang et al. | |
| 2012/0102240 A1 | 4/2012 | Wei et al. | |
| 2012/0106517 A1 | 5/2012 | Charbit et al. | |
| 2012/0113844 A1 | 5/2012 | Krishnamurthy | |
| 2012/0155406 A1 | 6/2012 | Kim et al. | |

(56) References Cited

U.S. PATENT DOCUMENTS

| | | |
|---|---|---|
| 2012/0176885 A1 | 7/2012 | Lee et al. |
| 2012/0176924 A1 | 7/2012 | Wu et al. |
| 2012/0207047 A1 | 8/2012 | Liao et al. |
| 2012/0207105 A1 | 8/2012 | Geirhofer et al. |
| 2012/0213057 A1 | 8/2012 | Zhang et al. |
| 2012/0213116 A1 | 8/2012 | Koo et al. |
| 2012/0213137 A1 | 8/2012 | Jeong et al. |
| 2012/0218913 A1 | 8/2012 | Park et al. |
| 2012/0220286 A1 | 8/2012 | Chen et al. |
| 2012/0230290 A1 | 9/2012 | Seo et al. |
| 2012/0250662 A1 | 10/2012 | Kuo |
| 2012/0252518 A1 | 10/2012 | Karampatsis et al. |
| 2012/0264483 A1 | 10/2012 | Chin et al. |
| 2012/0320791 A1 | 12/2012 | Guo et al. |
| 2013/0039439 A1 | 2/2013 | Kameya |
| 2013/0051277 A1 | 2/2013 | Hakola et al. |
| 2013/0053024 A1 | 2/2013 | Zou et al. |
| 2013/0080597 A1 | 3/2013 | Liao |
| 2013/0089065 A1 | 4/2013 | Koorapaty et al. |
| 2013/0170467 A1 | 7/2013 | Ogawa et al. |
| 2013/0195070 A1 | 8/2013 | Bashar et al. |
| 2013/0196679 A1 | 8/2013 | Widell et al. |
| 2013/0258874 A1 | 10/2013 | Khoshnevis et al. |
| 2013/0294307 A1 | 11/2013 | Johansson et al. |
| 2013/0295905 A1 | 11/2013 | Islam et al. |
| 2013/0301558 A1 | 11/2013 | Zakrzewski |
| 2013/0303206 A1 | 11/2013 | Starsinic et al. |
| 2013/0329545 A1 | 12/2013 | Wu et al. |
| 2013/0343252 A1 | 12/2013 | Chakraborty et al. |
| 2014/0016614 A1 | 1/2014 | Velev et al. |
| 2014/0018085 A1 | 1/2014 | Young et al. |
| 2014/0029625 A1 | 1/2014 | Edmiston |
| 2014/0036750 A1 | 2/2014 | Yavuz et al. |
| 2014/0036795 A1 | 2/2014 | Martinez Tarradell et al. |
| 2014/0044029 A1 | 2/2014 | Chou et al. |
| 2014/0057640 A1* | 2/2014 | Nagata .................. H04L 5/0035 455/450 |
| 2014/0086174 A1 | 3/2014 | Nam et al. |
| 2014/0092733 A1 | 4/2014 | Johansson et al. |
| 2014/0094125 A1 | 4/2014 | Behravan et al. |
| 2014/0112194 A1 | 4/2014 | Novlan et al. |
| 2014/0113667 A1 | 4/2014 | Keller et al. |
| 2014/0119261 A1 | 5/2014 | Wang et al. |
| 2014/0120967 A1 | 5/2014 | Purnadi et al. |
| 2014/0269383 A1 | 9/2014 | He et al. |
| 2014/0269779 A1 | 9/2014 | Shan et al. |
| 2014/0286215 A1 | 9/2014 | Koc et al. |
| 2014/0286302 A1 | 9/2014 | Khoryaev et al. |
| 2014/0295856 A1 | 10/2014 | Chou et al. |
| 2014/0321296 A1 | 10/2014 | Balraj |
| 2015/0009928 A1* | 1/2015 | Sohn .................... H04L 1/0026 370/329 |
| 2015/0029874 A1 | 1/2015 | Davydov et al. |
| 2015/0043438 A1 | 2/2015 | Fwu et al. |
| 2015/0092738 A1 | 4/2015 | Chakraborty et al. |
| 2015/0171939 A1 | 6/2015 | Davydov et al. |
| 2015/0215928 A1 | 7/2015 | Davydov et al. |
| 2015/0230179 A1 | 8/2015 | Gupta et al. |
| 2015/0230214 A1 | 8/2015 | Tong et al. |
| 2015/0230234 A1 | 8/2015 | Choi et al. |
| 2015/0237521 A1 | 8/2015 | Davydov et al. |
| 2015/0245221 A1 | 8/2015 | Yiu et al. |
| 2015/0249947 A1 | 9/2015 | Zhang et al. |
| 2015/0304076 A1 | 10/2015 | Lee et al. |
| 2015/0358931 A1 | 12/2015 | Koorapaty et al. |

FOREIGN PATENT DOCUMENTS

| | | |
|---|---|---|
| EP | 2733983 A2 | 5/2014 |
| EP | 2915358 A1 | 9/2015 |

OTHER PUBLICATIONS

Nam et al., Methods and Apparatus for Initial Access in an Advanced Wireless Communication System, U.S. Appl. No. 61/720,860, filed Oct. 31, 2012.*

"U.S. Appl. No. 14/119,228, Non Final Office Action mailed Jun. 19, 2015", 6 pgs.

"U.S. Appl. No. 14/119,228, Notice of Allowance mailed Sep. 29, 2015", 8 pgs.

"U.S. Appl. No. 14/119,228, Preliminary Amendment filed Nov. 21, 2013", 9 pgs.

"U.S. Appl. No. 14/119,228, Response filed Jul. 31, 2015 to Non Final Office Action mailed Jun. 19, 2015", 10 pgs.

"U.S. Appl. No. 14/124,457, Non Final Office Action mailed Jul. 15, 2015", 18 pgs.

"U.S. Appl. No. 14/124,457, Preliminary Amendment filed Dec. 6, 2013", 7 pgs.

"U.S. Appl. No. 14/124,457, Response filed Nov. 11, 2015 to Non Final Office Action mailed Jul. 15, 2015", 11 pgs.

"U.S. Appl. No. 14/124,939, Non Final Office Action mailed Oct. 29, 2015", 31 pgs.

"U.S. Appl. No. 14/124,939, Preliminary Amendment filed Dec. 9, 2013", 9 pgs.

"U.S. Appl. No. 14/124,964, Preliminary Amendment filed Dec. 9, 2013", 9 pgs.

"U.S. Appl. No. 14/125,472, Non Final Office Action mailed Oct. 29, 2015", 11 pgs.

"U.S. Appl. No. 14/125,472, Preliminary Amendment filed Dec. 11, 2013", 9 pgs.

"U.S. Appl. No. 14/125,767, Notice of Allowance mailed Dec. 24, 2015", 15 pgs.

"U.S. Appl. No. 14/125,767, Preliminary Amendment filed Dec. 12, 2013", 11 pgs.

"U.S. Appl. No. 14/126,611, Final Office Action mailed May 22, 2015", 11 pgs.

"U.S. Appl. No. 14/126,611, Non Final Office Action mailed Oct. 23, 2014", 10 pgs.

"U.S. Appl. No. 14/126,611, Notice of Allowance mailed Aug. 19, 2015", 12 pgs.

"U.S. Appl. No. 14/126,611, Preliminary Amendment filed Dec. 16, 2013", 11 pgs.

"U.S. Appl. No. 14/126,611, Response filed Jan. 23, 2015 to Non Final Office Action mailed Oct. 23, 2014", 12 pgs.

"U.S. Appl. No. 14/126,611, Response filed Jul. 24, 2015 to Final Office Action mailed May 22, 2015", 9 pgs.

"U.S. Appl. No. 14/126,654, Examiner Interview Summary mailed Feb. 25, 2015", 5 pgs.

"U.S. Appl. No. 14/126,654, Final Office Action mailed Jun. 18, 2015", 36 pgs.

"U.S. Appl. No. 14/126,654, Non Final Office Action mailed Nov. 6, 2014", 34 pgs.

"U.S. Appl. No. 14/126,654, Notice of Allowance mailed Sep. 29, 2015", 21 pgs.

"U.S. Appl. No. 14/126,654, Preliminary Amendment filed Dec. 16, 2013", 10 pgs.

"U.S. Appl. No. 14/126,654, Response filed Aug. 28, 2015 to Final Office Action mailed Jun. 18, 2015", 15 pgs.

"U.S. Appl. No. 14/126,654, Response fled Mar. 6, 2015 to Non Final Office Action mailed Nov. 6, 2014", 18 pgs.

"U.S. Appl. No. 14/126,998, Non Final Office Action mailed Sep. 25, 2015", 24 pgs.

"U.S. Appl. No. 14/126,998, Preliminary Amendment filed Dec. 17, 2013", 8 pgs.

"U.S. Appl. No. 14/127,015, Preliminary Amendment filed Dec. 17, 2013", 8 pgs.

"U.S. Appl. No. 14/127,092, Examiner Interview Summary mailed Oct. 9, 2015", 3 pgs.

"U.S. Appl. No. 14/127,092, Final Office Action mailed Jan. 6, 2016", 25 pgs.

"U.S. Appl. No. 14/127,092, Non Final Office Action mailed Jul. 6, 2015", 28 pgs.

"U.S. Appl. No. 14/127,092, Preliminary Amendment filed Dec. 17, 2013", 10 pgs.

"U.S. Appl. No. 14/127,092, Response Non Final Office Action mailed Jul. 6, 2015", 11 pgs.

(56) References Cited

OTHER PUBLICATIONS

"U.S. Appl. No. 14/127,621, Non Final Office Action mailed Jan. 14, 2016", 19 pgs.
"U.S. Appl. No. 14/127,621, Preliminary Amendment filed Dec. 19, 2013", 8 pgs.
"Aperiodic CSI Feedback for Rel-11 CoMP", 3GPP DRAFT; RI-123365 Aperiodic CSI Feedback for REL-11 COMP, 3rd Generation Partnership Project, vol. RAN WG, Retrieved from the Internet: <URL:http://www.3gpp.org/ftp/tsg_ran/WGI_RL1/TSGR1_70/Docs/>, (Aug. 5, 2012).
"European Application Serial No. 13851996.2, Extended European Search Report mailed Jul. 18, 2016", 15 pgs.
"European Application Serial No. 16163446.4, Extended European Search Report mailed Jul. 20, 2016", 11 pgs.
"Introduction of Rel-11 features", 3GPP Draft; RI-124012-36.213 CR0389 REL-11, B) Introduction of REL-11 Features, 3rd Generation Partnership Project (3GPP), Retrieved from the Internet: <URL:http://www.3gpp.org/ftp/tsg_ran/WGI_RL1/TSGR1_70/Docs/>, (Sep. 19, 2012).
"Maximum number CSI processes", 36PP Draft; RI-124290, 3rd Generation Partnership Project (36PP), Mobile Competence Centre,NEC Group, Retrieved from the Internet: <URL:http://www.3gpp.org/ftp/tsg_ran/WGI_RLI/TSGRI_70b/Docs>, (Sep. 29, 2012).
"Periodic CSI Feedback for Rel-11 CoMP", NTT Docomo, 3GPP Draft; RI-123364 Periodic CSI Feedback for REL-11 COMP, 3rd Generation Partnership Project (3GPP), Mobile Competence Centre, Retrieved from the Internet: <URL:http://www.3gpp.org/ftp/tsg_ran/WGI RL1/TSGR1_70/Docs/>, (Aug. 5, 2012).
"Remaining details of periodic CSI reporting", 3GPP Draft; RI-124723 Remaining Details of Periodic CSI Reporting, 3rd Generation Partnership Project (3GPP), Retrieved from the Internet: <URL:http://www.3gpp.org/ftp/tsg_ran/WGI_RLI/TSGRI_71/Docs>, (Nov. 2, 2012).
Huawei, et al., "Periodic CSI feedback collision handling for CoMP", 3GPP Draft; RI-123104, 3rd Generation Partnership Project (3GPP), Mobile Competence Centre, Retrieved from the Internet: <URL:http://www.3gpp.org/ftp/tsg_ran/WGI_RL1/TSGR1_70/Docs/>, (Aug. 5, 2012), 7 pgs.

\* cited by examiner

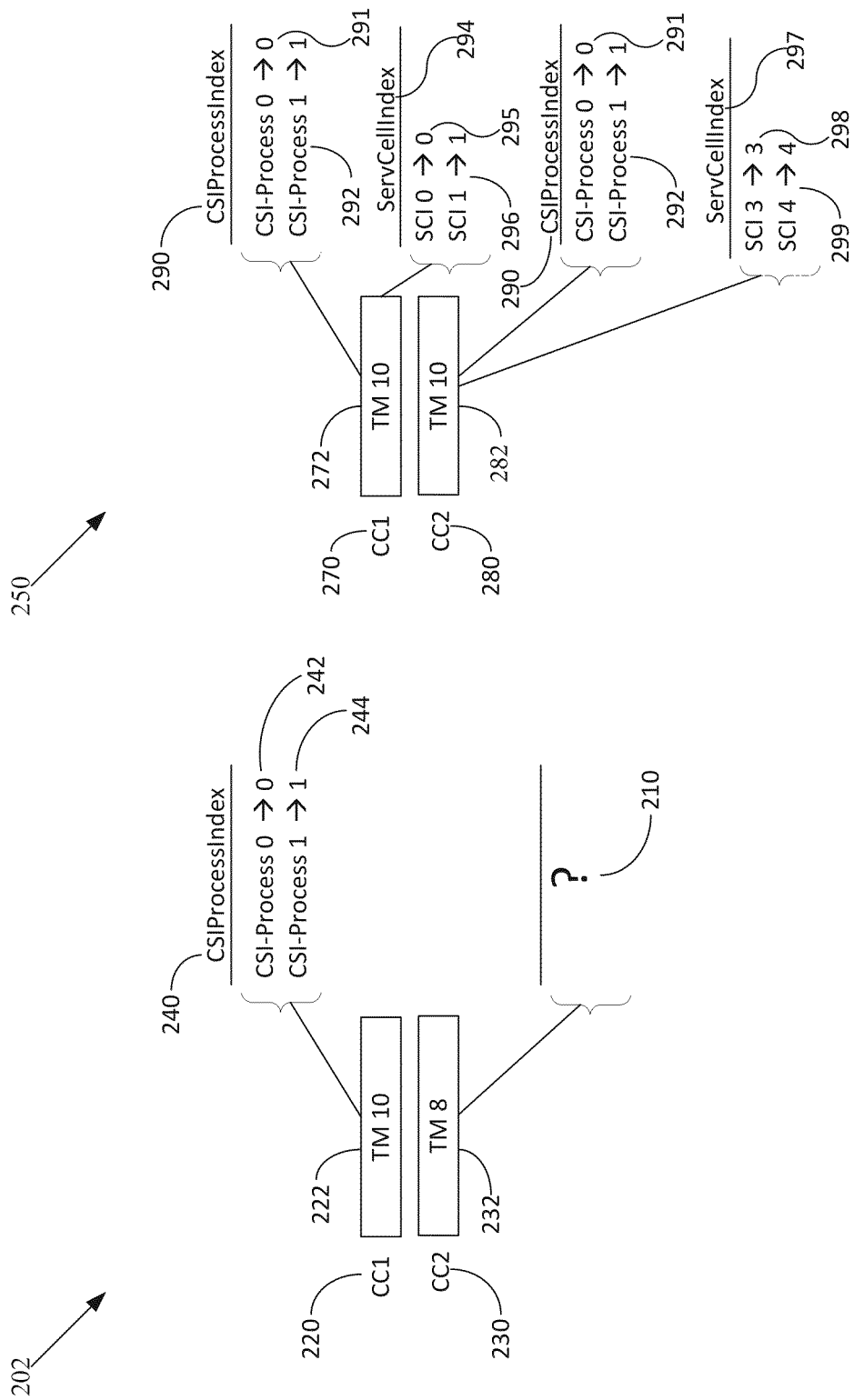

CHANNEL STATE INFORMATION FEEDBACK SCHEME FOR COOPERATIVE MULTI POINT TRANSMISSION AND CARRIER AGGREGATION SCENARIO

CLAIM OF PRIORITY

This application is a continuation of U.S. patent application Ser. No. 14/126,654, filed on Dec. 16, 2013, now issued as U.S. Pat. No. 9,277,471, which is a U.S. National Stage Filing under 35 U.S.C. 371 from International Application Number PCT/US2013/066786, filed on Oct. 25, 2013, which application claims the benefit of priority to U.S. Provisional Patent Application Ser. No. 61/721,436, filed on Nov. 1, 2012, each of which is incorporated herein by reference in its entirety.

BACKGROUND

The spectral efficiency of LTE may be increased through the simultaneous transmission of cooperative multi point (CoMP) and carrier aggregation (CA) targeting. Carrier aggregation (CA) allows the combination of two or more carrier channels into an aggregated channel, thus enabling higher throughput as well as more efficient use of the highly fragmented UE spectrum. A carrier aggregation configuration is defined as a set of one or more operating bands across which the BS aggregates carriers with a specific set of parameters. CoMP is a DL/UL orthogonalization technique to improve system capacity and cell edge user throughput. Currently, there are two different approaches for CoMP techniques. One approach is a decentralized autonomous control based on an independent eNB architecture, and the other is a centralized control based on remote radio equipment (RRE) architecture, which is also known as remote radio head (RRH).

There are practical benefits of simultaneously supporting CoMP and CA. For example, a macro eNB (evolved node B) may be deployed with a first component carrier (CC) while remote radio heads (RRHs) may be deployed with a second CC. For the user equipment (UE) at the cell-edge, between two RRHs, it is possible to benefit from the utilizing CoMP and CA simultaneously by configuring different transmission modes (TMs) on each of the CCs. Further, where two CCs are deployed in each of two macrocells, both CoMP and CA may be deployed and potentially COMP transmission for a UE at a cell-edge between two macro cells, e.g., transmission mode (TM) 10 may be deployed on both of CCs, wherein TM 10 provides non-codebook-based precoding supporting up to eight layers (suitable for CoMP). TM9 may be used to support transmission up to 8 layers from a cell, while TM10 supports CoMP transmissions from one or more cells. CoMP transmission can be signaled to the LTE with a combination of semi-static RRC signaling and dynamic signaling through PDCCH.

Different transmission modes may be applied to downlink signals depending on what use the transmission mode makes of transmit diversity, spatial multiplexing, cyclic delay diversity (CDD), etc. Downlink channel quality is assessed at the UE and may be reported via the channel state information (CSI) Information Element (IE). The PUCCH (physical uplink control channel) is used to carry CSI (channel state information) reports regarding channel conditions, which allow a transmission point, e.g., an eNB, to dynamically adjust the downlink signal to the varying propagating and interference conditions.

Accordingly, the transmission modes and schemes, as well as the PUCCH CSI configurations, for different CCs may be independently configured and may well be very different in terms of, for example, periodicity. A collision between two or more CSI reports of different "CSI report sets" with the same set of PUCCH reporting instances is hard to mitigate without very stringent scheduler restrictions. For example, a periodic CSI collision may happen when the periodicity of one CC is a multiple of the other one, e.g., 10 ms and 40 ms, and the configured offset is the same. A periodic CSI collision may also occur when the periodicity of one CC is not a multiple of the other one, e.g., 20 ms and 32 ms, and for certain configured offsets.

A CSIProcessIndex is used to identify multiple CSI processes within a given CC. In order to support the feedback configuration and reporting for simultaneous CA and CoMP, a ServCellIndex is included to indicate the configured CC. The CSIProcessIndex is a parameter that is used for the CSI dropping rules in a CoMP scenario in case of collision between CSI reports of different serving cells with PUCCH reporting type of the same priority. Thus, a CSI dropping rule may be used for the scenario where TM 10 is configured for the CCs because the CSIProcessIndex is available for each serving cell with TM 10 configuration. However, the CSIProcessIndex is unspecified for legacy TMs (TMs 1-9) and thus handling CSI collisions for a hybrid TM case poses problems where a hybrid combination of legacy TMs and TM 10 is configured for CCs of one particular UE.

BRIEF DESCRIPTION OF THE DRAWINGS

FIGS. 2a-b illustrate CSIProcessIndex configurations for a CA and CoMP arrangement according to embodiments;

DETAILED DESCRIPTION

Figure 1B:
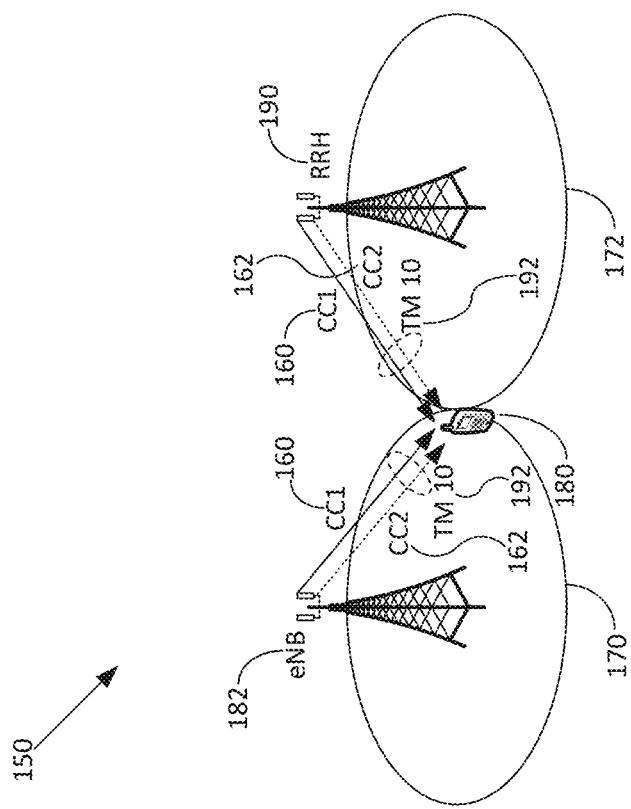
FIGS. 1a-b illustrates scenarios for simultaneous CoMP and CA according to an embodiment.
Figure 1A:
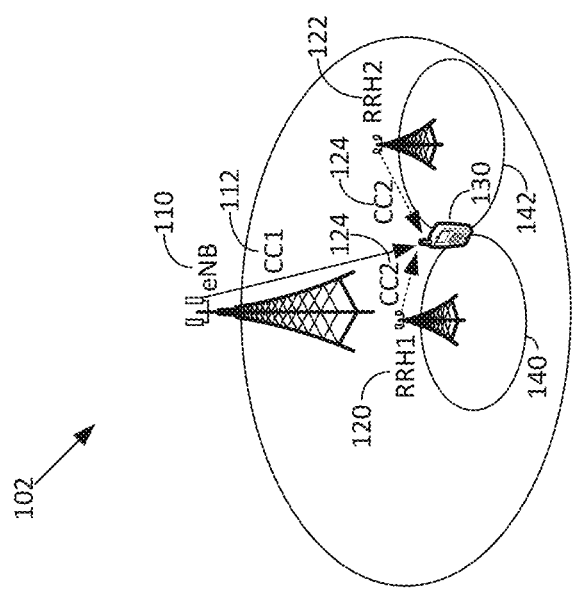

Embodiments described herein address the collision handling for periodic CSI reports in cooperative multi point (CoMP) and carrier aggregation (CA) scenarios when hybrid transmission/mixed modes are configured on different component carriers (CCs) for a given user equipment (UE). Rules are used to prioritize which downlink (DL) carrier is reported in case of collision in a given subframe for the CoMP and CA scenario FIGS. 1a-b illustrates scenarios for simultaneous COMP and CA according to an embodiment. FIGS. 1a-b show the practical benefits of simultaneously supporting COMP and CA in two scenarios, e.g. heterogeneous 102 and homogeneous 150 networks, respectively. In FIG. 1a, a macro eNB (evolved node B) 110 is deployed with CC1 (component carrier 1) 112 while RRH1 (remote radio head 1) 120 and RRH2 122 are deployed with CC2 124. In FIG. 1a, the user equipment (UE) 130 is shown near an edge of two subcells 140, 142. CC2 124 is used to provide a first signal from RRH1 120 to the UE 130 and to provide a second signal to the UE 130 from RRH2 122. The eNB 110 uses CC1 112 to provide signaling to the UE 130. For the UE 130 at the cell-edge between RRH1 120 and RRH2 122, it is possible to benefit from the utilizing CoMP and CA simultaneously by configuring different transmission mode (TM) on the CCs 112, 124. Thus, a different TM is used on different CCs 112, 124.

In FIG. 1b, the homogenous network 150 includes two CCs 160, 162 that are deployed in each macrocell 170, 172, e.g., CC1 160 and CC2 162 are provided to the UE 180 by eNB 182. RRH 190 also provides CC1 160 and CC2 162 to UE 180. For the cell-edge UE 180 between the two macro cells 170, 172, both CoMP and CA may be deployed and potentially COMP transmission, e.g., TM 10 192 may be deployed on both CC1 160 and CC2 162.

FIGS. 2a-b illustrate CSIProcessIndex configurations for a CA and CoMP arrangement according to embodiments: In FIG. 2a, a hybrid TM configuration 202 for CCs is shown. FIG. 2b shows a configuration 250 wherein TM 10 is configured for the CCs. Similar to the use of multiple CCs for CA, transmission modes and schemes, as well as the PUCCH (physical uplink control channel) CSI (channel state information) configurations for different CCs, are independently configured and may well be very different in terms of, for example, periodicity.

Collisions between 2 or more CSI reports may occur between CSI report sets with or without the same set of PUCCH reporting instances. Given the limited capacity of PUCCH, a dropping rule for types of collisions, e.g., intra-CSI process collisions of feedback reports and inter-CSI process collisions of feedback reports, may be used to prioritize which DL carrier is reported in case of collision in a given subframe for the COMP and CA scenario. A dropping rule according to an embodiment may include the following priority order based on reporting type and CSI process/CC index:

Reporting type (1st)→CSI process index (2nd)→CC index (3rd).

If the UE is configured with more than one serving cell, the UE may transmit a CSI report of one serving cell in any given subframe. For a given subframe, in case of collision of a CSI report with PUCCH reporting type 3, 5, 6, or 2a of one serving cell with a CSI report with PUCCH reporting type 1, 1a, 2, 2b, 2c, or 4 of another serving cell, the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell with CSI report with PUCCH reporting type 1 or 1a of another serving cell, the latter CSI report with PUCCH reporting type 1, or 1a has lower priority and is dropped.

However, a collision between 2 or more CSI reports of different CSI report sets with the same set of PUCCH reporting instances is hard to mitigate without very stringent scheduler restrictions. For example, the periodic CSI collision may happen when the periodicity of one CC is a multiple of the other one, e.g., 10 ms and 40 ms, and the configured offset is the same. In addition, a periodic CSI collision may occur when the periodicity of one CC is not a multiple of the other one, e.g., 20 ms and 32 ms, and for certain configured offsets.

In FIG. 2a, management of CSI collision issues for the hybrid TM case is unspecified for legacy TMs, i.e., TMs 1-9, and the CSIProcessIndex is not taken into account 210. More specifically, CC1 220 uses TM 10 222 and CC2 230 uses TM 8 232. The CSIProcessIndex 240 for TM 10 222 is shown to include CSI-Process 0→0 242 and CSI-Process 1→1 244. However, the CSIProcessIndex 240 for transmission mode 8 232 is not available 210. In FIG. 2b, CC1 270 uses TM 10 272 and CC2 280 uses TM 10 282. The CSIProcessIndex 290 for each of TM 10 272 and TM 10 282 are shown to include CSI-Process 0→0 291 and CSI-Process 1→1 292. The ServCellIndex 294 for the TM 10 272 is shown to include ServCellIndex (SCI) 0→0 295 and ServCellIndex (SCI) 1→1 296. The ServCellIndex 297 for the TM 10 282 is shown to include ServCellIndex (SCI) 3→3 298 and ServCellIndex (SCI) 4→4 299.

For a given subframe and UE using CC1 270 with TM 10 272 and CC2 280 with TM 10 282, in case of collision between CSI reports of different serving cells with PUCCH reporting type of the same priority and the CSI reports corresponding to CSI processes with same CSIProcessIndex 290, the CSI reports of the serving cells, except the serving cell with lowest ServCellIndex 290, 294, are dropped. For a given subframe and UE using CC1 270 with TM 10 272 and CC2 280 with TM 10 282, in case of collision between CSI reports of different serving cells with PUCCH reporting type of the same priority and the CSI reports corresponding to CSI processes with different CSIProcessIndex 290, the CSI reports of the serving cells, except the serving cell with CSI reports corresponding to CSI process with the lowest CSIProcessIndex 290, are dropped.

The CSIProcessIndex parameters 290 plays a role in the CSI dropping rule for COMP scenario in case of collision between CSI reports of different serving cells with PUCCH reporting type of the same priority. Thus, the CSIProcessIndex 290 provides an effective tool for an eNB scheduler to improve the COMP performance in practice. For example, when dynamic point selection (DPS) is implemented, wherein the transmission point is varied according to changes in channel and interference conditions, eNB could assign the smallest CSIProcessIndex 290 to the transmission point (TP) with the higher geometry to optimize the DPS COMP performance. Therefore, the CSI dropping rule described above works well for the scenario as shown in FIG. 1b and FIG. 2b where TM 10 192, 272, 282 are configured for CCs 160, 162, 270, 280 because the CSIProcessIndex 290 is available, i.e., for each serving cell with TM 10 configurations 272, 282.

But in FIG. 1a and FIG. 2a, a hybrid combination of legacy TMs 232 and TM 10 222 is configured for CCs 220, 230 of one particular UE, e.g., TM 10 222 is used on CC1 220 and TM 8 232 is used on CC2 230. Thus, it is still unclear how to handle the CSI collision issue for the hybrid TM case, taking into account CSIProcessIndex 240 is unspecified 210 for the legacy TM. e.g., TM 8 232 shown in FIG. 1b.

Figure 3:
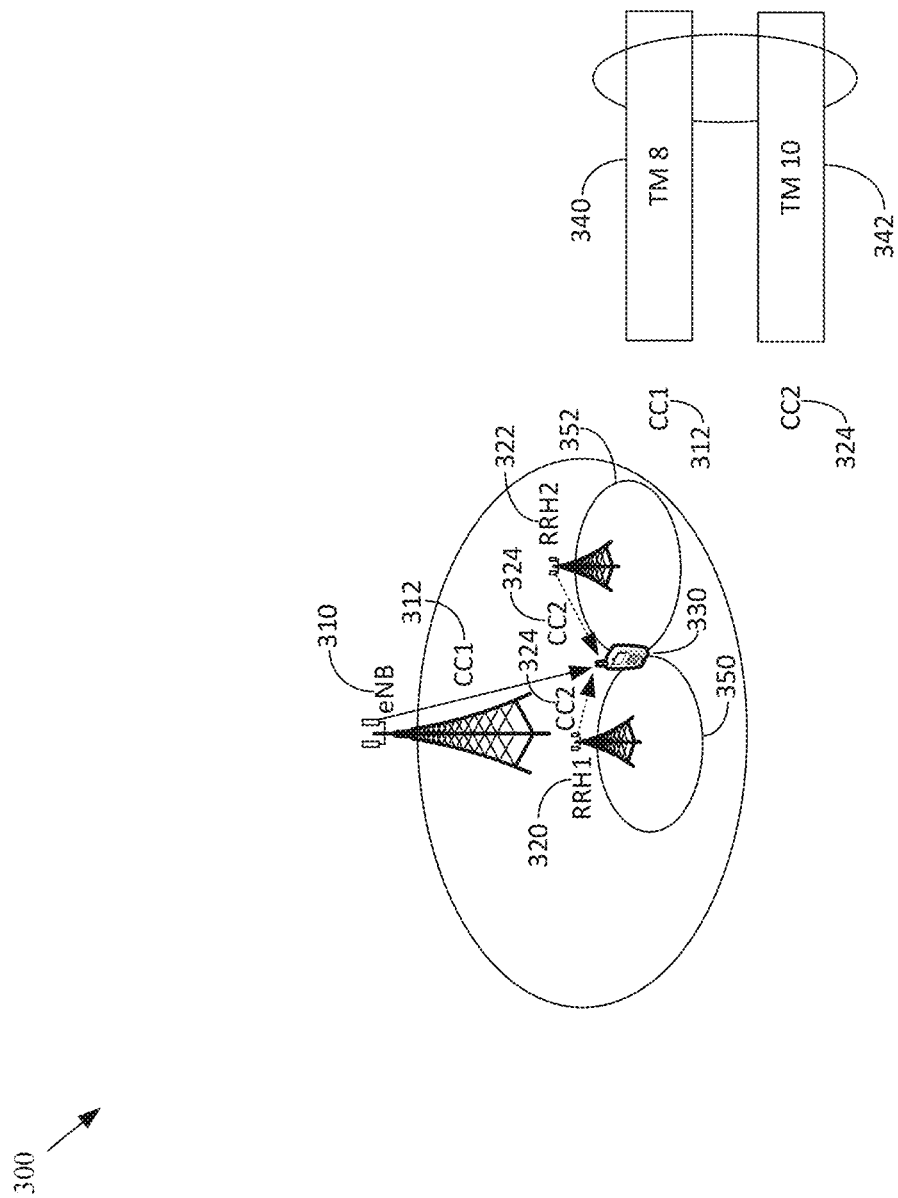
FIG. 3 illustrates a hybrid TM configuration in a heterogeneous network according to an embodiment.

FIG. 3 illustrates a hybrid TM configuration in a heterogeneous network 300 according to an embodiment. In FIG. 3, the UE 330 is shown near an edge of two subcells 350, 352. CC2 324 uses TM 10 342 to provide a first signal from RRH1 320 to the UE 330 and to provide a second signal to the UE 330 from RRH2 322. The eNB 310 uses CC1 312 and TM 8 340 to provide signaling to the UE. Accordingly, FIG. 3 shows a UE 330 is configured with different TMs 340, 342 on different serving cells. Embodiments, described herein, address the collision handling for periodic CSI report in CoMP and CA scenario when hybrid transmission/mixed modes are configured on different CCs 312, 324 for a given UE 330.

An embodiment is provided in case of collision between CSI reports of different serving cells with a PUCCH reporting type having the same priority. The CSI for TM 1-9 340 is (Alternative 1, see below) or conditionally (Alternative 2, see below) given higher priority than TM 10 342. This embodiment involves a scenario when the UE 330 is configured with more than one serving cell, e.g., CC1 312 and CC2 324, and at least one serving cell is configured with TM 10 342 and at least one serving cell is configured with TM 1-9 340. In this scenario, the CSI for TM 1-9 340 is given higher priority than TM 10 342 based on a selected rule.

Figure 4:
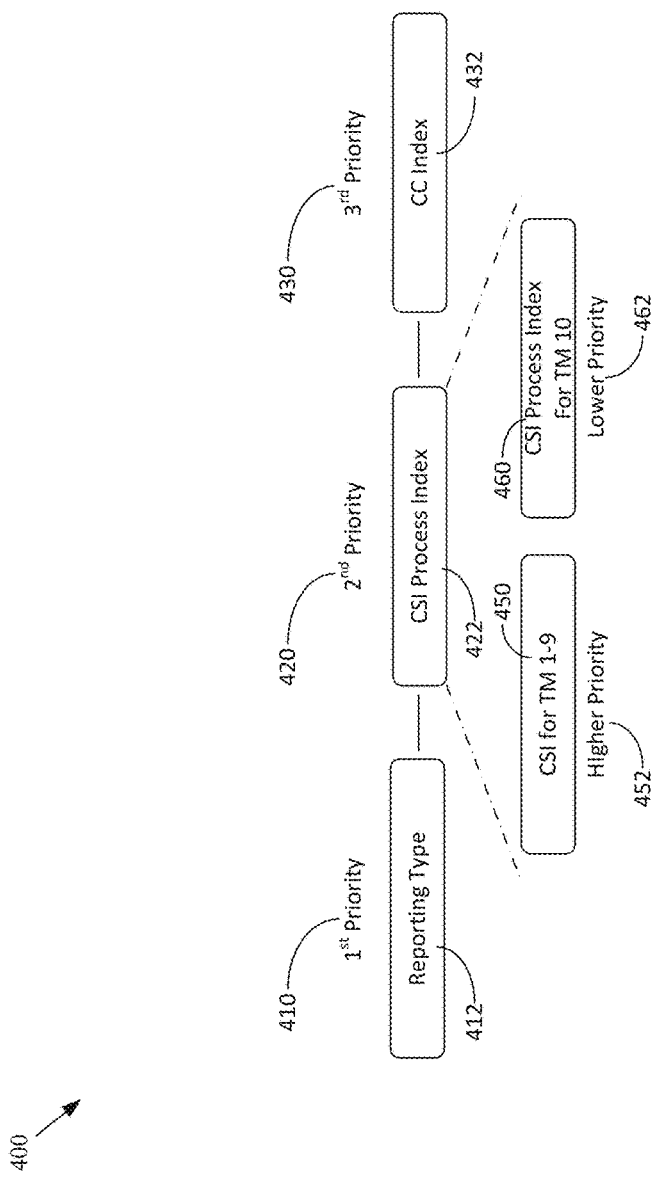
FIG. 4 illustrate priority ranking for CSI dropping rules for a hybrid TM case according to one alternative dropping rule set according to an embodiment.

FIG. 4 illustrate priority ranking for CSI dropping rules 400 for a hybrid TM case according to one alternative dropping rule set according to an embodiment. In FIG. 4, a 1st priority 410, 2nd priority 420 and 3rd priority 430 are shown. The 1st priority 410 is associated with the reporting type 412. The 2nd priority 420 is associated with the CSI process index 422. The third priority 430 is associated with the CC index 432. According to the second priority 420 based on the CSI process index 422, the CSI report associated with TM 1-9 450 is given a higher priority 452 than the lower priority 460 for CSI report associated with CSI process index for TM 10 462.

Figure 5A:
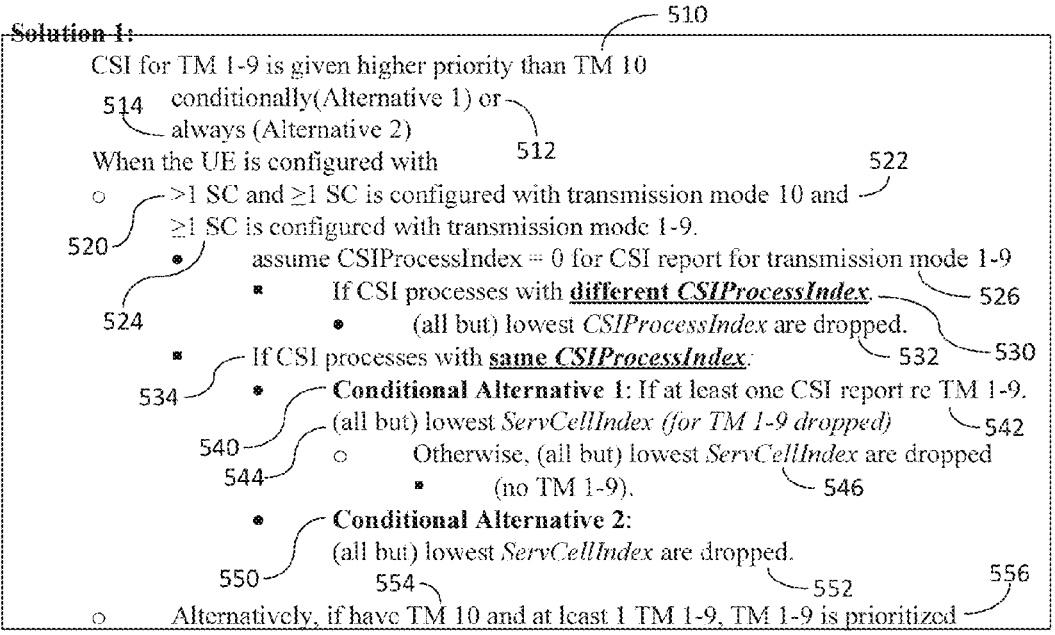
FIGS. 5a-c illustrate dropping rules for a hybrid TM case with a with PUCCH reporting type of the same priority according to an embodiment.
Figure 5B:
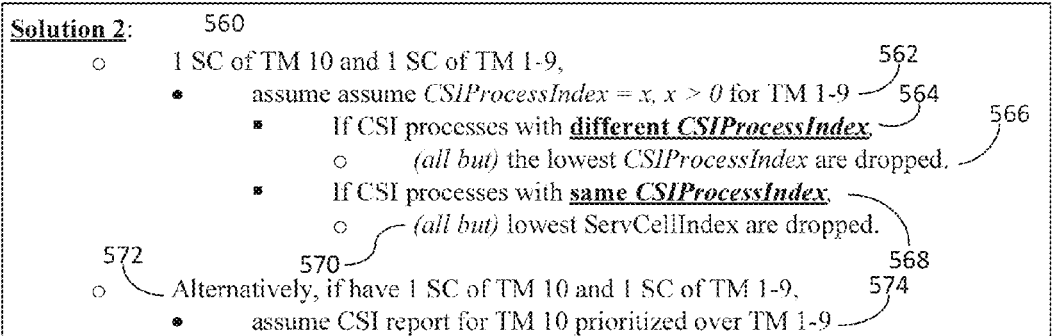
Figure 5C:
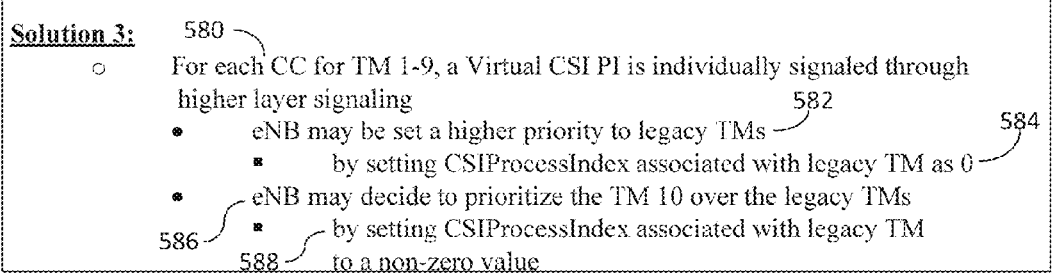

FIGS. 5a-c illustrate dropping rules for a hybrid TM case with a with PUCCH reporting type of the same priority according to an embodiment. Thus, as shown in FIG. 4, the first priority 410 is not applicable and the second 420 and third 430 priorities are used. According to the dropping rule shown in FIG. 5a, for a given subframe, the CSI report for TM1-9 is given higher priority than the CSI report for TM 10 510 conditionally 512 or always 514.

More specifically, when the UE is configured with more than one servicing cell 520, i.e., more than one CC, and one or more serving cell is configured with TM 10 522 and one or more serving cell is configured with TM 1-9 524, the UE may assume CSIProcessIndex=0 for CSI report for TM 1-9 526 to handle the collision between CSI reports of different serving cells.

In case of collision between CSI reports of different serving cells with PUCCH reporting type of the same priority and the CSI reports corresponding to CSI processes with different CSIProcessIndex 530, the CSI reports of the serving cells except the serving cell with CSI reports corresponding to CSI process with the lowest CSIProcessIndex are dropped 532. In case of collision between CSI reports of different serving cells with PUCCH reporting type of the same priority and the CSI reports corresponding to CSI processes with same CSIProcessIndex 534, two conditional alternatives are provided, conditional alternative one 540 and conditional alternative two 550.

First, if at least one CSI reports corresponding to TM 1-9 is in the given subframe 542, the CSI reports of the serving cells except the serving cell with lowest ServCellIndex of CSI reports corresponding to CSI for TM 1-9 are dropped 544. Otherwise, the CSI reports of the serving cells except the serving cell with lowest ServCellIndex are dropped 546. The second conditional alternative involves the CSI reports of the serving cells except the serving cells with the lowest ServCellIndex are dropped 552.

Alternatively, i.e., for the always alternative 514 for a given subframe and UE in TM 10 for one serving cell and in TM 1-9 at least for the other serving cell 554, UE may assume CSI report for TM 1-9 is prioritized over CSI report for TM 10 556 to handle the collision between CSI reports of different serving cells. It means CSI report for TM 10 is dropped when there is collision between CSI reports of different serving cells.

Another embodiment is provided in the case where a given subframe and UE may be configured with TM 10 for one serving cell and with TM 1-9 at least for the other serving cell 560, the UE may assume CSIProcessIndex=x for x>0 for TM 1-9 562. If the CSI processes are associated with different CSIProcessIndex 564, all but the lowest CSIProcessIndex may be dropped 566. For example, a value of 4 may be used. If the CSI processes are associated with the same CSIProcessIndex 568, all but the lowest ServCellIndex may be dropped 570.

Alternatively, if there are one or more serving cell with at least one with TM 10 and if there are one or more serving cells with TM 1-9 572, the UE may assume the CSI report for TM 10 is prioritized over TM 1-9 574.

The third solution involves the use of a virtual CSI process index. According to the third embodiment, the virtual CSI process index for each CC configured with a legacy TM, i.e., TM 1-9, is individually signaled through higher layer signaling 580. This embodiment has the benefit of providing more flexibility for the eNB scheduler to semi-statically reconfigure the priority of legacy TMs in various simultaneous CoMP and CA scenarios. For example, eNB may be assumed to be initially set a higher priority for the legacy TMs over TM 10 582 by setting CSIProcessIndex associated with legacy TM as 0 584. The UE may be informed through RRC signaling. However, if later eNB decides to prioritize the TM 10 over the legacy TMs 586, then CSIProcessIndex associated with legacy TM may be reset from 0 to 4 or other non-zero value 588, and the updated value may be transmitted through RRC signaling.

Figure 6:
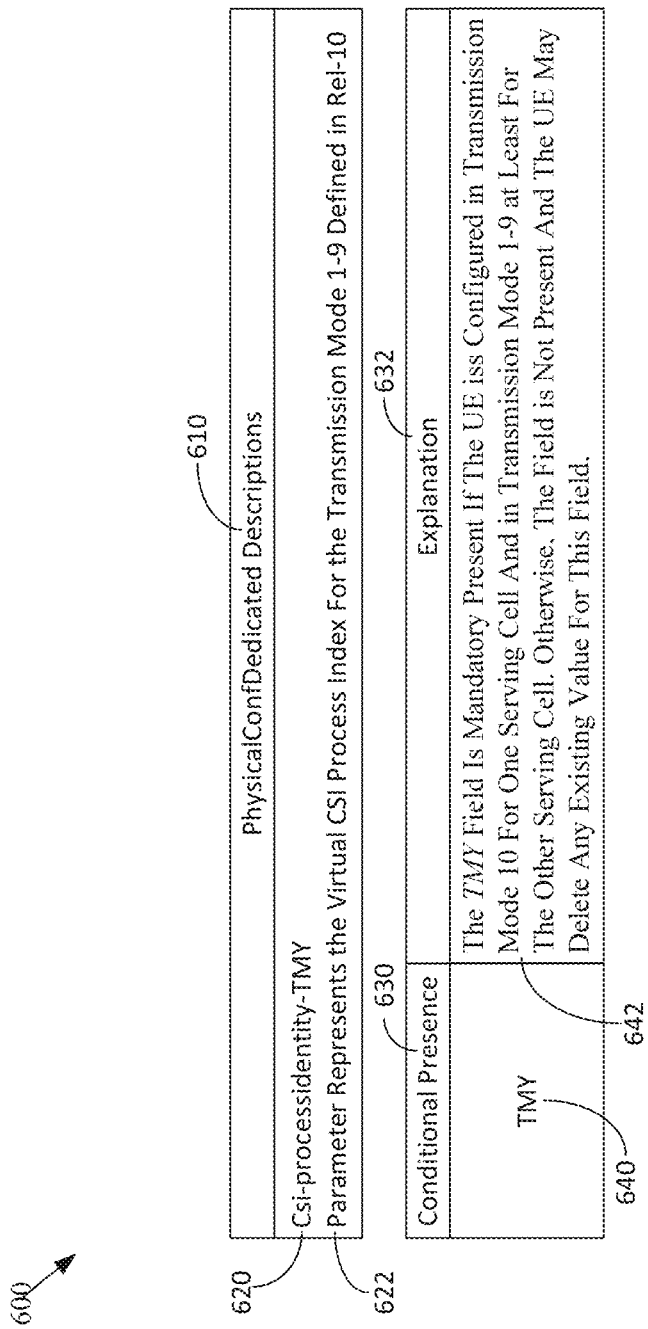
FIG. 6 illustrates RRC signaling structure according to an embodiment.

FIG. 6 illustrates RRC signaling structure 600 according to an embodiment. In FIG. 6, the PhysicalConfigDedicated information element may include dedicated physical configuration descriptions 610. For example, csi-processidentity-TMY 620 may be included to provide a parameter representing the virtual CSI process index for the TM 1-9 622, e.g., as defined in Rel-10. A conditional presence indicator field 630 may also be provided and operates according to an explanation 632. The conditional presence includes TMY field 640. A description 642 is provided to explain the use of the TMY field 640. For example, in FIG. 6, the TMY field 640 is present if the UE is configured in TM 10 for one serving cell and in TM 1-9 at least for the other serving cell; otherwise the field is not present and the UE may delete any existing value for this field 642.

Figure 7:
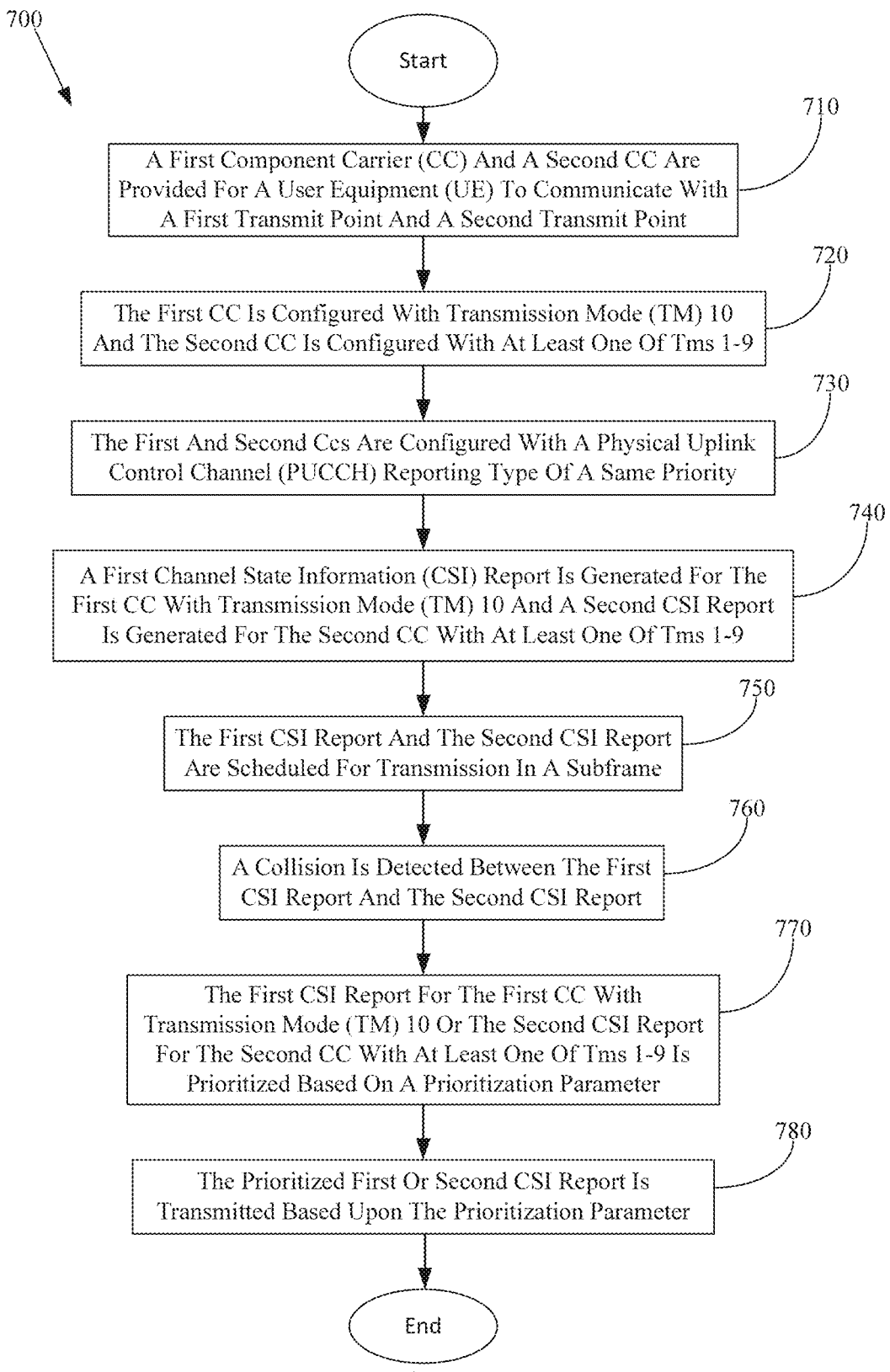
FIG. 7 is a flowchart of a method for reporting uplink control information (UCI) using a channel state information feedback scheme for cooperative multi point transmission and carrier aggregation scenarios according to an embodiment.

FIG. 7 is a flowchart 700 of a method for reporting uplink control information (UCI) using a channel state information feedback scheme for cooperative multi point transmission and carrier aggregation scenarios according to an embodiment. A first component carrier (CC) and a second CC are provided for a user equipment (UE) to communicate with a first transmit point and a second transmit point 710. The first CC is configured with TM (TM) 10 and the second CC is configured with at least one of TMs 1-9 720. The first and second CCs are configured with a physical uplink control channel (PUCCH) reporting type of a same priority 730. A first channel state information (CSI) report is generated for the first CC with TM (TM) 10 and a second CSI report is generated for the second CC with at least one of TMs 1-9

740. The first CSI report and the second CSI report are scheduled for transmission in a subframe 750. A collision is detected between the first CSI report and the second CSI report 760. The first CSI report for the first CC with TM (TM) 10 or the second CSI report for the second CC with at least one of TMs 1-9 is prioritized based on a prioritization parameter 770. The prioritized first or second CSI report is transmitted based upon the prioritization parameter 780.

Figure 8:
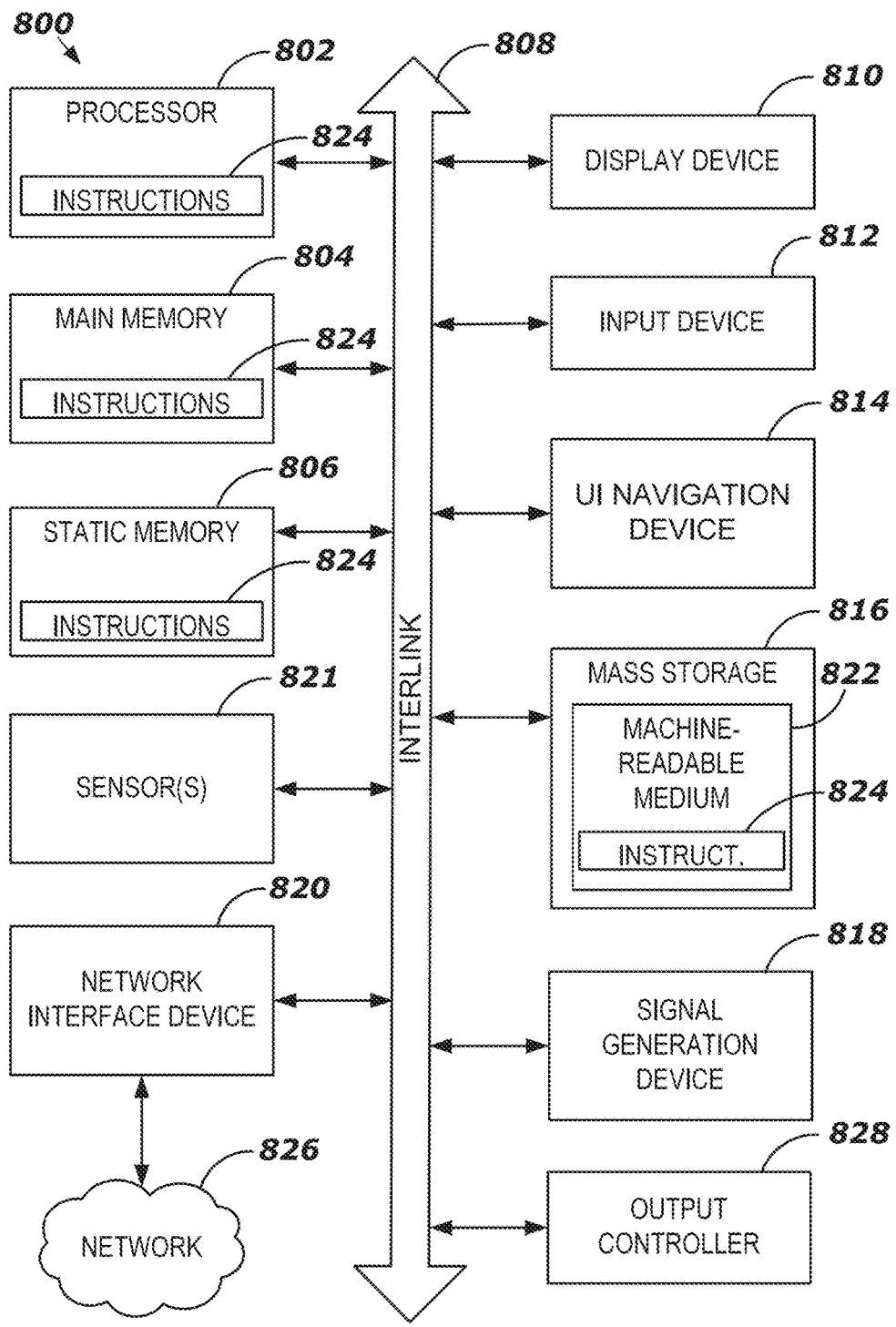
FIG. 8 illustrates a block diagram of an example machine for reporting uplink control information (UCI) using a channel state information feedback scheme for cooperative multi point transmission and carrier aggregation scenarios according to an embodiment.

FIG. 8 illustrates a block diagram of an example machine 800 for reporting uplink control information (UCI) using a channel state information feedback scheme for cooperative multi point transmission and carrier aggregation scenarios, according to an embodiment, upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine and/or a client machine in server-client network environments. In an example, the machine 800 may act as a peer machine in peer-to-peer (P2P) (or other distributed) network environment. The machine 800 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities e.g., hardware capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 802 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 802 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 800 may include a hardware processor 802 (e.g., a central processing unit (CPU), a graphics processing unit (GPU), a hardware processor core, or any combination thereof), a main memory 804 and a static memory 806, at least some of which may communicate with others via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared OR)) connection to communicate or control one or more peripheral devices e.g., a printer, card reader, etc.).

The storage device 816 may include at least one machine readable medium 822 on which is stored one or more sets of data structures or instructions 824 (e.g., software) embodying or utilized by any one or more of the techniques or functions described herein. The instructions 824 may also reside, at least partially, additional machine readable memories such as main memory 804, static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) that configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols. Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA). Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 may include subject matter (such as a method or means for performing acts) for providing a first component carrier (CC) configured with transmission mode (TM) 10 and a second CC configured with at least one of TMs 1-9 for a user equipment (UE) to communicate with a first transmit point and a second transmit point;

configuring the first and second CCs with a physical uplink control channel (PUCCH) reporting type of a same priority;

generating a first channel state information (CSI) report for the first CC and a second CSI report for the second CC;

detecting a collision between a scheduled transmission of the first CSI report and the second CSI report in a subframe;

prioritizing the first CSI report for the first CC or the second CSI report for the second CC based on a prioritization parameter; and transmitting the first or second CSI report based upon the prioritizing of the first CSI report and the second report using the prioritization parameter.

Example 2 may optionally include the subject matter of Example 1, Error! Reference source not found.

Example 3 may optionally include the subject matter of Example 1 or 2, Error! Reference source not found.

Example 4 may optionally include the subject matter of one or more of Examples 1-3, Error! Reference source not found.

Example 5 may optionally include the subject matter of one or more of Examples 1-4, Error! Reference source not found.

Example 6 may optionally include the subject matter of one or more of Examples 1-5, Error! Reference source not found.

Example 7 may optionally include the subject matter of one or more of Examples 1-6, Error! Reference source not found.

Example 8 may optionally include the subject matter of one or more of Examples 1-7, Error! Reference source not found.

Example 9 may optionally include the subject matter of one or more of Examples 1-8, Error! Reference source not found.

Example 10 includes subject matter (such as a device, apparatus, client or system) including Error! Reference source not found.

Example 11 may optionally include the subject matter of Example 10, Error! Reference source not found.

Example 12 may optionally include the subject matter of Example 10 or 11, Error! Reference source not found.

Example 13 may optionally include the subject matter of one or more of Examples 10-12, Error! Reference source not found.

Example 14 may optionally include the subject matter of one or more of Examples 10-13, Error! Reference source not found.

Example 15 may optionally include the subject matter of one or more of Examples 10-14, Error! Reference source not found.

Example 16 may optionally include the subject matter of one or more of Examples 10-15, Error! Reference source not found.

Example 17 may optionally include the subject matter of one or more of Examples 10-16, Error! Reference source not found.

Example 18 may optionally include the subject matter of one or more of Examples 10-17, Error! Reference source not found.

Example 19 may include subject matter (such as means for performing acts or machine readable medium including instructions that, when executed by the machine, cause the machine to perform acts) including Error! Reference source not found.

Example 20 may optionally include the subject matter of Example 19, Error! Reference source not found.

Example 21 may optionally include the subject matter of Example 19 or 20, Error! Reference source not found.

Example 22 may optionally include the subject matter of one or more of Examples 19-21, Error! Reference source not found.

Example 23 may optionally include the subject matter of one or more of Examples 19-22, Error! Reference source not found.

Example 24 may optionally include the subject matter of one or more of Examples 19-23, Error! Reference source not found.

Example 25 may optionally include the subject matter of one or more of Examples 19-24, Error! Reference source not found.

Example 26 may optionally include the subject matter of one or more of Examples 19-25, Error! Reference source not found.

Example 27 may optionally include the subject matter of one or more of Examples 19-26, Error! Reference source not found.

The above detailed description includes references to the accompanying drawings, which form a part of the detailed description. The drawings show, by way of illustration, specific embodiments that may be practiced. These embodiments are also referred to herein as "examples," Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of user equipment (UE), the apparatus comprising processing circuitry and transceiver circuitry configured to:
   receive radio-resource control (RRC) signaling from an enhanced node B (eNB) to configure the UE for periodic channel state information (CSI) reporting for each of two or more active serving cells, using a physical uplink control channel (PUCCH), the periodic CSI reporting being in accordance with a PUCCH reporting type, of a plurality of PUCCH reporting types, for each of the two or more active serving cells;
   generate CSI reports for each of the two or more active serving cells, each CSI report configured in accordance with one of the PUCCH reporting types; and
   drop one or more of the CSI reports generated for different active serving cells, for PUCCH reporting types having a same priority, when a collision between the CSI reports occurs,
   wherein the one or more of the CSI reports are dropped based on one or more of a transmission mode, a serving cell index or CSI process identifier (ID) associated with the CSI reports,
   wherein the UE is configured for transmission mode 10 in at least one of the active serving cells,
   wherein the one or more of the serving cell index or CSI process ID associated with the CSI reports used to determine the one or more of the CSI reports dropped is dependent on in which transmission mode the UE is configured in at least one other of the active serving cells, and
   wherein when the UE is configured for transmission mode 1-9 in the at least one other of the active serving cells, the UE is further to receive an update of a virtual CSI process index from the eNB through the RRC signaling, the update configured to change prioritization between the transmission modes 1-9 and transmission mode 10 by adjustment of the virtual CSI process index of the transmission modes 1-9 between 0 and a non-zero value.

2. The apparatus of claim 1, wherein:
   in case of the collision between the CSI reports being between the CSI reports having a same CSI process ID, for a given subframe and for PUCCH reporting types having the same priority, the one or more of the CSI reports are dropped based on the serving cell index, and
   wherein in case of the collision between the CSI reports being between the CSI reports having different CSI process IDs, for a given subframe and for PUCCH reporting types having the same priority, the one or more of the CSI reports are dropped based on the CSI process ID.

3. The apparatus of claim 2, wherein each of the plurality of PUCCH reporting types indicates support for one or more of channel quality information feedback (CQI), precoding matrix indicator (PMI) feedback, and rank indicator (RI) feedback, and wherein the transceiver circuitry is configured to transmit one or more of the CSI reports that are not dropped.

4. The apparatus of claim 3 wherein the processing circuitry is further configured to:
   determine a priority of the PUCCH reporting type associated with each CSI report, and for a given subframe and for PUCCH reporting types having the same priority, drop one or more of the CSI reports generated for different active serving cells, when the collision between the CSI reports occurs, based on one of a serving cell index or CSI process ID associated with the CSI report.

5. The apparatus of claim 3 wherein the processing circuitry is further configured to:
   for a given subframe and for PUCCH reporting types having different priority, drop one or more of the CSI reports for different active serving cells associated with a PUCCH reporting type of a lower priority, when the collision between the CSI reports occurs.

6. The apparatus of claim 1 wherein the UE is configured for transmission mode 10 in at least two of the active serving cells, and wherein for CSI reports of the at least two of the active serving cells, for a given subframe and for PUCCH reporting types having the same priority, the processing circuitry is configured to:

drop the one or more of the CSI reports except for the CSI report of an active serving cell with a lowest valued serving cell index, in case of the collision between the CSI reports being between the CSI reports having a same CSI process ID, and drop the one or more of the CSI reports except for the CSI report of an active serving cell with a lowest CSI process ID, in case of the collision between the CSI reports being between the CSI reports having different CSI process IDs.

7. The apparatus of claim 1 wherein for a CSI report of the at least one of the active serving cells and for a CSI report of the at least one other of the active serving cells, for a given subframe and for the PUCCH reporting types having the same priority, the processing circuitry is configured to:

drop the one or more of the CSI reports having a CSI process ID greater than a predetermined value.

8. The apparatus of claim 1 wherein for a CSI report, having a predetermined CSI process ID, of the at least one of the active serving cells and for a CSI report of the at least one other of the active serving cells, for a given subframe and for the PUCCH reporting types having the same priority, the processing circuitry is configured to:

drop the CSI report having a highest valued serving cell index when the CSI report of the at least one of the active serving cells has a CSI process ID equal to a predetermined value.

9. The apparatus of claim 1 wherein a collision occurs when the CSI reports are scheduled for transmission within a same subframe, and wherein the processing circuitry is configured to determine when the collision between the CSI reports occurs between CSI reports scheduled within the same subframe.

10. The apparatus of claim 1 wherein the transceiver circuitry is configured to transmit one or more of the CSI reports that are not dropped, the one or more of the CSI reports transmitted by the transceiver circuitry including multiple periodic CSI reports when configured for transmission mode 10.

11. The apparatus of claim 6 wherein the processing circuitry is further configured to receive RRC signaling to:

configure the UE for at least one of coordinated multipoint (CoMP) communication or carrier aggregation (CA) using a first component carrier of a first active serving cell of the active serving cells for transmission mode 10, and a second component carrier of a second active serving cell of the active serving cells for transmission mode 10.

12. The apparatus of claim 7, wherein the processing circuitry is further configured to receive RRC signaling to configure the UE for at least one of coordinated multipoint (CoMP) communication or carrier aggregation (CA) using a first component carrier of a first active serving cell of the active serving cells for transmission mode 10, and a second component carrier of a second active serving cell of the active serving cells for one of transmission modes 1-9.

13. The apparatus of claim 1 further comprising two or more antennas coupled to the transceiver circuitry configured to receive a plurality of component carriers for at least one of coordinated multipoint (CoMP) communication or carrier aggregation (CA).

14. A non-transitory computer-readable storage medium that stores instructions for execution by one or more processors of user equipment (UE) to configure the UE to:

receive radio-resource control (RRC) signaling from an enhanced node B (eNB) to configure the UE for periodic channel state information (CSI) reporting for each of two or more active serving cells, using a physical uplink control channel (PUCCH), the periodic CSI reporting being in accordance with a PUCCH reporting type, of a plurality of PUCCH reporting types, for each of the two or more active serving cells;

generate CSI reports for each of the two or more active serving cells, each CSI report configured in accordance with one of the PUCCH reporting types; and drop one or more of the CSI reports, for different active serving cells, for PUCCH reporting types having a same priority, when a collision between the CSI reports occurs, wherein the one or more of the CSI reports are dropped based on one of a serving cell index or CSI process identifier (ID) associated with the CSI reports, wherein the HE is configured for transmission mode 10 in at least one of the active serving cells, and wherein the one or more of the serving cell index or CSI process ID associated with the CSI reports used to determine the one or more of the CSI reports dropped is dependent on in which transmission mode the LIE is configured in at least one other of the active serving cells, and wherein when the HE is configured for transmission mode 1-9 in the at least one other of the active serving cells, the UE is further to receive an update of a virtual CSI process index from the eNB through the RRC signaling, the update configured to change prioritization between the transmission modes 1-9 and transmission mode 10 by adjustment of the virtual CSI process index of the transmission modes 1-9 between 0 and a non-zero value.

15. The non-transitory computer-readable storage medium of claim 14 wherein in case of the collision between the CSI reports being between the CSI reports having a same CSI process ID, for a given subframe and for PUCCH reporting types having the same priority, the one or more of the CSI reports are dropped based on the serving cell index, and wherein in case of the collision between the CSI reports being between the CSI reports having different CSI process IDs, for a given subframe and for PUCCH reporting types having the same priority, the one or more of the CST reports are dropped based on the CSI process ID.

16. The non-transitory computer-readable storage medium of claim 15, wherein each of the plurality of PUCCH reporting types indicates support for one or more of channel quality information feedback (CQI), precoding matrix indicator (PMI) feedback, and rank indicator (RI) feedback, and wherein the instructions configure the UE to transmit one or more of the CSI reports that are not dropped.

17. The non-transitory computer-readable storage medium of claim 16 wherein the instructions configure the one or more processors to:

determine a priority of the PUCCH reporting type associated with each CSI report, and for a given subframe and for PUCCH reporting types having the same priority, drop one or more of the CSI reports generated for different active serving cells, when the collision between the CSI reports occurs, based on one of a serving cell index or CSI process ID associated with the CSI report.

18. The non-transitory computer-readable storage medium if claim 16 wherein the instructions configure the one or more processors to:
  for a given subframe and for PUCCH reporting types having different priority, drop one or more of the CSI reports for different active serving cells associated with a PUCCH reporting type of a lower priority, when the collision between the CSI reports occurs.

19. The non-transitory computer-readable storage medium of claim 14 wherein the UE is configured for transmission mode 10 in at least two of the active serving cells, and wherein for CSI reports of active serving cells, in which the LIE is configured for transmission mode 10, for a given subframe and for PUCCH reporting types having the same priority, the instructions configure the one or more processors to:
  drop the one or more of the CSI reports except for the CSI report of an active serving cell with a lowest valued serving cell index, in case of the collision between the CSI reports being between the CSI reports having a same CSI process ID, and drop the one or more of the CSI reports except for the CSI report of an active serving cell with a lowest CSI process ID, in case of the collision between the CSI reports being between the CSI reports having different CSI process IDs.

20. An apparatus of user equipment (LIE), the apparatus comprising processing circuitry and transceiver circuitry configured to:
  receive radio-resource control (RRC) signaling from an enhanced node B (eNB) to configure the UE for periodic channel state information (CSI) reporting for two or more active serving cells in which the UE configured for transmission mode 10 for at least one of the active serving cells and configured for one of transmission modes 1-9 for at least one other of the active serving cells, the RRC signaling to configure the UE for periodic CSI reporting, the periodic CSI reporting using a physical uplink control channel (PUCCH), the periodic CSI reporting being in accordance with a PUCCH reporting type, of a plurality of PUCCH reporting types, for each of the two or more active serving cells;
  generate CSI reports for each of the two or more active serving cells, each CSI report configured in accordance with one of the PUCCH reporting types; and
  drop one or more of the CSI reports generated for different active serving cells, for a given subframe and for PUCCH reporting types having a same priority, when a collision occurs, wherein which of a plurality of parameters associated with the CSI reports used to determine the one or more of the CSI reports dropped is dependent on in which transmission mode the UE is configured in the different active serving cells, and
  wherein the UE is further to receive an update of a virtual CSI process index from the eNB through the RRC signaling, the update configured to change prioritization between the transmission modes 1-9 and transmission mode 10 by adjustment of the virtual CSI process index of the transmission modes 1-9 between 0 and a non-zero value.

21. The apparatus of claim 20 wherein for a CSI report of the at least one of the active serving cells and for a CSI report of the at least one other of the active serving cells, for a given subframe and for the PUCCH reporting types having the same priority, the processing circuitry is configured to:
  drop the one or more of the CSI reports having a CSI process ID greater than a predetermined value.

22. The apparatus of claim 20 wherein for a CSI report, having a predetermined CSI process ID, of the at least one of the active serving cells and for a CSI report of the at least one other of the active serving cells, for a given subframe and for the PUCCH reporting types having the same priority, the processing circuitry is configured to:
  drop the CSI report having a highest valued serving cell index when the CSI report of the at least one of the active serving cells has a CSI process ID equal to a predetermined value.

23. The apparatus of claim 1, wherein the CSI report for the at least one other of the active serving cells is configurable by dropping rules to always or conditionally be given higher priority than the CSI report for the at least one of the active serving cells.

24. The apparatus of claim 1, wherein the CSI process ID for the at least one of the active serving cells and the at least one other of the active serving cells is different, and the CSI reports other than a CSI report with a lowest CSI process ID are dropped independent of the serving cell index for the at least one other of the active serving cells.

25. The apparatus of claim 1, wherein the CSI process ID for the at least one of the active serving cells and the at least one other of the active serving cells are the same, and the CSI reports other than a CSI report with a lowest serving cell index for the at least one other of the active serving cells are dropped.

26. The apparatus of claim 1, wherein the CSI process ID for the at least one of the active serving cells and the at least one other of the active serving cells are the same, and the CSI reports for other than a CSI report with a lowest serving cell index are dropped.

27. The apparatus of claim 1, wherein a first CSI report of a first active serving cell of the at least one of the active serving cells and the at least one other of the active serving cells is prioritized over a second CSI report of a second active serving cell of the at least one of the active serving cells and the at least one other of the active serving cells, the first CSI report prioritized over the second CSI report based on the transmission mode independent of the CSI process ID and serving cell index such that the second CSI report is dropped.

* * * * *

UNITED STATES PATENT AND TRADEMARK OFFICE
CERTIFICATE OF CORRECTION

PATENT NO. : 9,674,753 B2  
APPLICATION NO. : 15/013658  
DATED : June 6, 2017  
INVENTOR(S) : He et al.

Page 1 of 1

It is certified that error appears in the above-identified patent and that said Letters Patent is hereby corrected as shown below:

In Column 14, Line 22, in Claim 14, delete "HE" and insert --UE-- therefor

In Column 14, Line 27, in Claim 14, delete "LIE" and insert --UE-- therefor

In Column 14, Line 29, in Claim 14, delete "HE" and insert --UE-- therefor

In Column 14, Line 48, in Claim 15, delete "CST" and insert --CSI-- therefor

In Column 15, Line 13, in Claim 19, delete "LIE" and insert --UE-- therefor

In Column 15, Line 26, in Claim 20, delete "(LIE)," and insert --(UE),-- therefor Signed and Sealed this  
Third Day of April, 2018

Andrei Iancu  
*Director of the United States Patent and Trademark Office*